(12) United States Patent
Hofmann

(10) Patent No.: US 6,958,016 B2
(45) Date of Patent: Oct. 25, 2005

(54) TRIPODE JOINT FOR INCREASED ARTICULATION ANGLES

(75) Inventor: Norbert Hofmann, Ronneburg (DE)

(73) Assignee: GKN Driveline Deutschland GmbH (DE)

( * ) Notice: Subject to any disclaimer, the term of this patent is extended or adjusted under 35 U.S.C. 154(b) by 0 days.

(21) Appl. No.: 10/677,672

(22) Filed: Oct. 2, 2003

(65) Prior Publication Data
US 2004/0110568 A1 Jun. 10, 2004

(30) Foreign Application Priority Data
Oct. 2, 2002 (DE) .......................................... 102 46 169

(51) Int. Cl.$^7$ .............................................. F16D 3/205
(52) U.S. Cl. ...................................... 464/111; 464/905
(58) Field of Search ................................ 464/111, 123, 464/124, 905, 132

(56) References Cited
U.S. PATENT DOCUMENTS 5,171,185 A * 12/1992 Schneider .................. 464/111
5,397,271 A * 3/1995 Poulin ........................ 464/111
5,525,109 A * 6/1996 Hofmann et al. ........... 464/111
5,836,822 A * 11/1998 Kudo et al. ................. 464/111

* cited by examiner

Primary Examiner—Greg Binda

(57) ABSTRACT

A tripode joint having an outer joint part (11) having three uniformly circumferentially distributed recesses (15) which forms pairs of circumferentially opposed tracks (16) for receiving a roller assembly (13). Each roller assembly (13) is carried on an arm (19) of a tripode star (12). Each arm head has a spherical surface portion. Each roller assembly (13) includes an annular roller carrier (23, 123), bearing needles (24) rotating on the roller carrier (23, 123), and rollers (25) which are rotatably supported on the bearing needles (24). The roller carriers (23, 123) include stop collars which delimit the needle contact face, and which are held with an axial displacement clearance in the direction of the roller axes between axial securing members (26, 27) in such a way that they are secured against being lost relative to the rollers (25).

13 Claims, 5 Drawing Sheets

TRIPODE JOINT FOR INCREASED ARTICULATION ANGLES

TECHNICAL FIELD

The invention relates to a tripode joint having an outer joint part with a first longitudinal axis and an inner recess and three uniformly circumferentially distributed recesses which widen the inner recess and which form pairs of circumferentially opposed tracks. The joint also includes a tripode star with a second longitudinal axis and a hub and three uniformly circumferentially distributed tripode arms which are arranged radially at the hub. Each arm includes an arm head with a spherical surface portion, and an assembly comprising an annular roller carrier, bearing needles rotating on the roller carrier, and rollers which are rotatably supported on the bearing needles. The roller carriers, on their inner faces, each comprise a cylindrical arm contact face and, on their outer faces, a cylindrical needle contact face. Further, each of the arm heads holds a roller assembly and each of the roller assemblies is guided in one of the recesses. The roller carriers are arranged on the arm heads so as to be pivotable and displaceable along an arm axis, and the rollers roll on the tracks with roller axes which are substantially axis-normal relative to the first longitudinal axis.

BACKGROUND Of THE INVENTION

A tripode joint of the above-mentioned type have been produced and distributed by GKN Driveline Deutschlafld GmbH for some time under the designation of AAR tripode joints. In particular, they are used in motor vehicle driveshafts such as sideshafts which serve to provide a driving connection between the differential drive and the driving wheels. It is common practice to use so-called constant velocity fixed ball joints at the wheel end and so-called AAR tripode joints as plunging joints at the differential. To date, the AAR tripode joints have been designed for articulation angles ranging from approximately 23° to 26°. In connection with the increasing popularity of off-road vehicles and sport utility vehicles, there is an increasing demand for larger operational articulation angles which, so far, has meant that the so-called AAR tripode Joints were replaced by double offset joints which are also axially displaceable (DO plunging joints) or by a combination of constant velocity fixed ball joints and axial plunging units. Such solutions are either less advantageous in respect of their NVH (noise, vibration) harshness) behavior (DO plunging joints) or generate much higher production costs (fixed ball joints with additional plunging units). Thus, there exits a need for tripode joint having an increased articulation angle.

SUMMARY OF THE INVENTION

The present invention provides AAR tripode joints which are suitable for larger operational articulation angles. According to a solution in accordance with the invention, the roller carriers, on their outer faces, comprise stop collars which delimit the needle contact face, and which are held with an axial displacement clearance in the direction of the roller axes between axial securing members in such a way that they are secured against being lost relative to the rollers. The roller carriers, on their inner faces, with reference to the first longitudinal axis, at least on the radial inside end, comprise cylindrical projections which, with reference to the roller axes, increase the axial length of the arm contact faces beyond the extension of the needle contact faces.

In this way it is ensured that, in the case of an articulation movement between the tripode star and the outer joint part, and when the arm heads dive inwardly within the recesses, the roller carriers move radially inwardly together with the respective arm heads in such a way that an effective contact between the spherical surface of the arm heads and the internally cylindrical arm contact faces of the roller carriers is maintained. The roller carriers, by means of the externally cylindrical needle contact faces slide axially in the direction of the roller axes while at the same time carrying out a rolling contact movement on the needle bearings, provided the joint is articulated while carrying out a rotational movement at the same time. The friction forces which displace the roller carriers axially in the direction of the roller axes are applied by the spherical surface portions of the arm heads to the arm contact faces of the roller carriers. No relative rotational movement takes place between the spherical arm heads and the roller carriers. If, subsequently, the joint is moved from an articulated position into an aligned position, the roller carriers are returned radially outwardly into the recesses by the same friction forces between the spherical surface portions of the arm heads and the arm contact faces of the roller carriers until, if applicable, they stop against the radially outer axial securing members.

In an advantageous embodiment, the axial securing members each comprise at least one securing ring which engages an inner annular groove in the rollers. The rollers, in the form of second axial securing members, can comprise an integrally formed on collar which, in respect of function, corresponds to a securing ring. This design ensures an easy axial assembly of the rollers, bearing needles and roller carriers. According to a another embodiment, the axial securing members each comprise two identical securing rings which engage two identical inner annular grooves in each roller and, between them, enclose the roller carrier with the inventive displacement clearance in accordance with the invention in such a way that it cannot get lost.

With a given unchanged design of the outer joint part and the tripode star, the required increase in the articulation angles is achieved entirely by the inventive design of the roller assemblies with an axial displacement clearance in the direction of the roller axes. According to one embodiment, at the roller assemblies, the axial length of the cylindrical projection and the amount of the axial displacement clearance are dimensioned to be such that, with a joint articulation angle of at least 27°, more particularly of at least 29°, the spherical surface portions of the arm heads are able to establish a carrying contact with the arm contact faces of the roller carriers. The displacement clearance (SA) can amount to at least 5% of the carrying length of the bearing needles, preferably at least 10% of the length and, more particularly, it can amount to 20–25% of the carrying length of the bearing needles.

According to another embodiment, on the roller carriers, with reference to the first longitudinal axis, on their radial outside end, are contacted by arm contact faces and needle contact faces in such a way these are flush with the roller carriers. In this way, roller carrier weight can be saved.

According to a further embodiment, the roller carriers, with reference to the first longitudinal axis, on their radial outside end, comprise cylindrical projections which, with reference to the roller axes, increase the axial length of the arm contact faces beyond the extension of the needle contact faces. In this embodiment, the roller carrier can be designed to be symmetrical in order to simplify assembly.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

Figure 1:
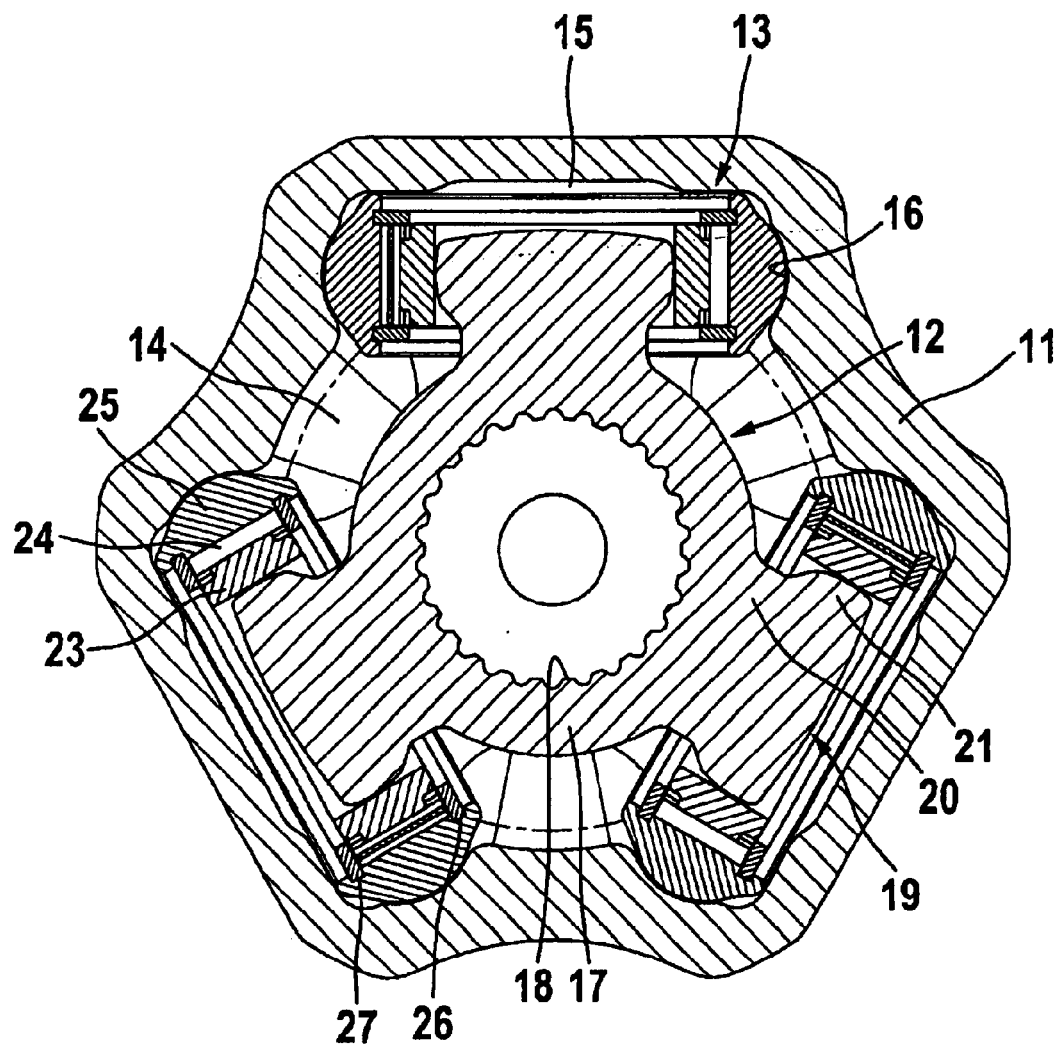
FIG. 1 shows an inventive tripode joint in a cross-section through the tripode star.

FIGS. 1 shows an inventive tripode joint in a cross-sectional view in which it is possible to identify an outer joint part 11, an inner joint part referred to as a so-called tripode star 12, as well as three roller assemblies 13. The outer joint part 11 also referred to as joint tulip is provided with an inner recess 14 and three uniformly circumferentially distributed recesses or widened regions 15 which are each occupied by one of the roller assemblies 13. The recesses 15 form pairs of circumferentially opposed fillet-shaped tracks 16. The tripode star 12 comprises an annular hub member 17 provided with an inner recess 18 for inserting a shaft. At the hub 17 there are arranged three uniformly circumferentially distributed tripode arms 19 which each comprise a reduced arm neck 20 and a arm head 21 provided with a partially spherical guiding face 22. The roller assemblies 13 each comprise a substantially hollow-cylindrical roller carrier 23, bearing needles 24 and externally spherical rollers 25. Relative to the rollers 25, the bearing needles 24 and roller carriers 23 are held by securing rings 26, 27 in such a way that they cannot become dislodged or fall out of the assemblies.

Figure 2:
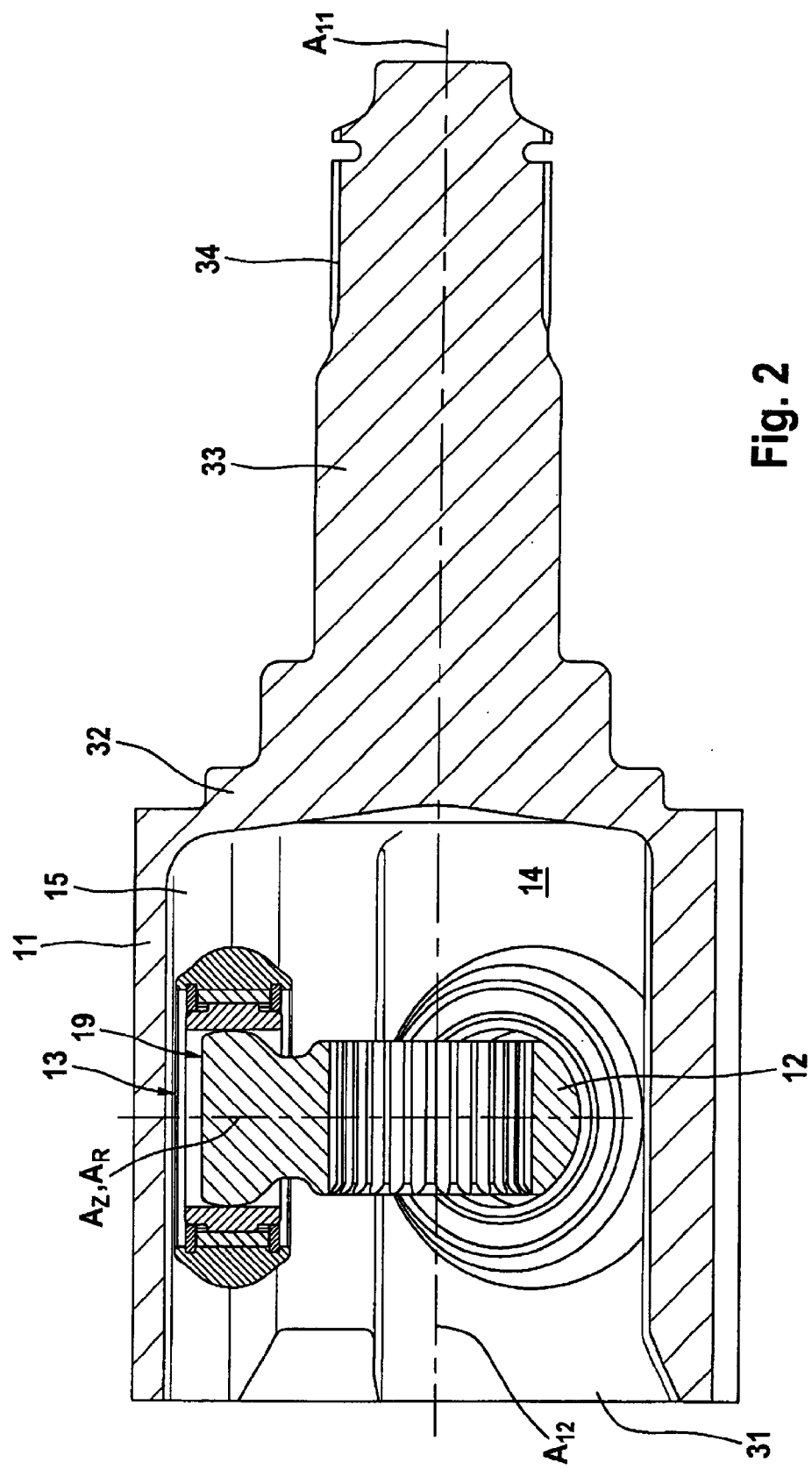
FIG. 2 shows the inventive tripode joint according to FIG. 1 in a longitudinal section through a tripode arm.

Any details in FIG. 2 which are identical to those in FIG. 1 have been given the same reference numbers as in FIG. 1. Therefore, reference is made to the description of FIG. 1 to the extent that the details will not be specifically mentioned. In the longitudinal section through the tripode joint, it can be seen that the outer joint part 11 comprises an aperture 31 through which a shaft can be inserted into the inner joint part. It is also possible to see a joint base 32 and an adjoining journal 33 whose end is provided with a shaft profile 34. The axis of the outer joint part has been given the reference symbol A11. The section shows the interior 14 and one of the recesses 15 which is sectioned in its center. The Figure shows only one of the roller assemblies 13 and one of the tripode arms 19 which can be seen in an axial section. The axis of the tripode star 12 has been given the reference symbol A12 and, in this illustration, extends coaxially relative to the axis A11 of the outer joint part 11.

FIGS. 1 and 2 initially show that during a rotational movement of the inner joint part and outer joint part the tripode star 12 is axially displaceable relative to the outer joint part 11, with the rollers 25 being able to carry out a rolling movement on the roller carriers 23 while being supported by needles. It can also be seen that when the axes A12 and A11 are articulated relative to one another, the roller assemblies 13 are held in an axis-normal position of the roller axes AR relative to the axis A11, whereas the tripode arms 19 with the arm axes AZ are simultaneously inclined relative to the roller axes AR in the articulation plane formed by the axes A11 and A12 by the same angle at which the axis A12 is articulated relative to the axis A11. At the same time, it is necessary for the arm heads 21 to carry out an inwardly directed radial movement inside the roller carriers 23. This situation will be referred to again at a later stage.

Figure 3:
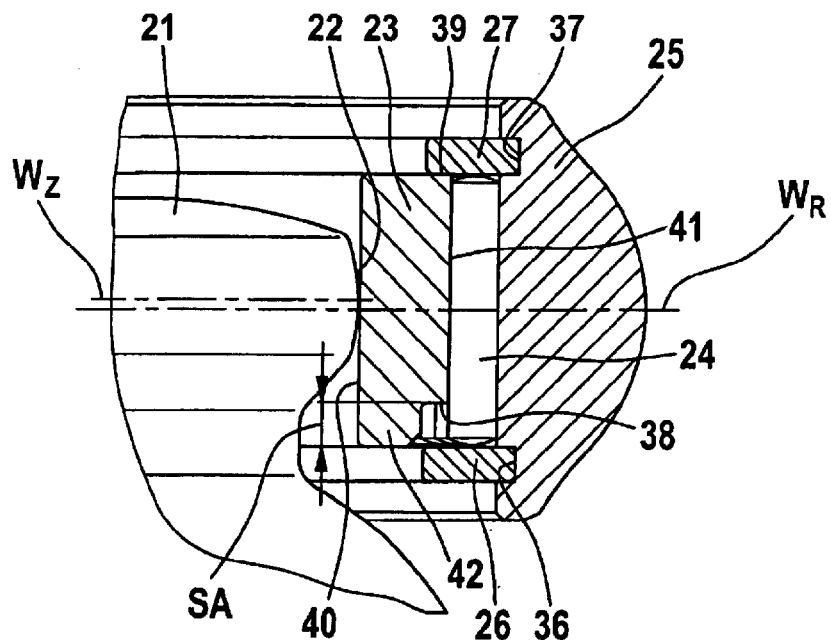
FIG. 3 shows half a section through an inventive roller assembly along the roller axis in a first embodiment.

FIG. 3 shows an inventive roller assembly in half a section through the roller axis in a first embodiment. The associated tripode arm can also be seen. The Figure shows the relative position which is assumed when the joint is in the aligned position, with the axes A11 and A12 coinciding. WZ refers to the effective line by which the spherical face 22 of the arm head 21 acts on the roller carriers 23 of the roller assembly. WR refers to the effective line by which the track 16 in the outer joint part acts on the roller 25. The parallel offset of the two effective lines shows that, when torque is transmitted, a tilting moment is applied to the roller assembly, so that, when the joint is in an aligned position, the roller assembly assumes a stable position of contact within the tracks. The bearing needles 24 as well as the roller carriers 23 are held by two securing rings 26, 27 relative to the roller 25 In such a way that they cannot get lost. The two securing rings engage inner grooves 36, 37 formed in the cylindrical inner face of the roller 25. On its outside, the roller carrier 23 is held by two stop collars 38, 39 with an axial displacement clearance between the securing rings 26, 27 and, with reference to the axis (not shown) of the tripode star, on the radial inside end, comprises a cylindrical projection 42. The stop collars 38, 39 delimit the axial length of the needle contact face 41. The axial length of the needle contact face 41 positioned on the outside is smaller by the displacement clearance SA than the inner distance between the securing rings 26, 27. The length of the arm contact face 40 on the inside corresponds to the inner distance between the securing rings 26, 27. The axial displacement clearance SA is obtained as a result of the shortened needle contact face 41 on the outside of the roller carrier 23 relative to the arm contact face 40 on the inside of the roller carrier 23. Thus, the cylindrical projections 42, with respect to the roller axes AR, increase the axial length of the arm contact face 40 beyond the extension of the needle contact face 41. However, in this example, at the radial outside end of each roller carrier, with respect to the first longitudinal axis A11, the arm contact face 40 and the needle contact face 41 are flush with each other.

As far as the functioning of the inventive joint is concerned, the roller carrier 23 should be radially inwardly displaceable relative to the roller 25 with reference to the axis of the tripode star, which displaceability permits greater movement of the arm head 21 when the joint is articulated in that the arm head 21 takes along the roller carrier 23 radially inwardly via friction forces and, in the process, displaces the arm contact face 40 far enough for the contact with the arm head 21 not to be lost. The greater arm head movements which are possible as a result correspond to greater articulation movements of the joint.

Figure 4:
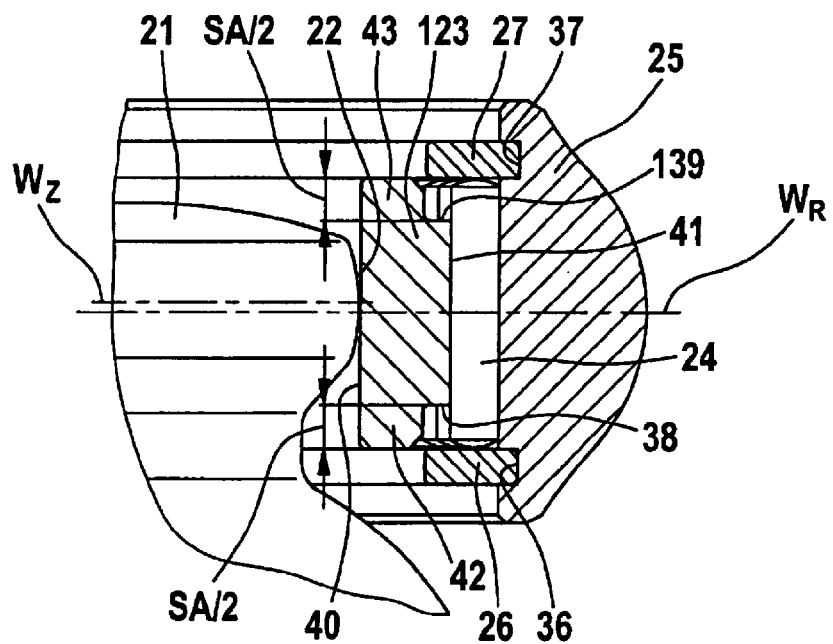
FIG. 4 shows half a section through an inventive roller assembly along the roller axis in a second embodiment.

FIG. 4 shows an inventive roller assembly as already illustrated in FIG. 3, in a half-section through the roller axis in a modified embodiment. The associated tripode arm 19 can again be seen, with the Figure showing the relative position assumed when the joint is in the aligned condition, with the axes 11 and 12 coinciding. WR refers to the effective line by which the track 16 if the outer joint part acts on the roller 25. The parallel offset of the two effective lines shows that, when torque is transmitted, a tilting moment is applied to the roller assembly, so that, when the joint is in an aligned position, the roller assembly assumes a stable position of contact within the tracks. The bearing needles 24 as well as the roller carriers 123 are held by two securing rings 26, 27 relative to the roller 25 In such a way that they cannot get lost. The two securing rings engage inner grooves 36, 37 formed in the cylindrical inner face of the roller 25. On its outside, the roller carrier 123 is held by two stop collars 38, 139 with an axial displacement clearance between the securing 26, 27 and, with reference to the axis (not shown) of the tripode star, on the radial inside end, comprises a cylindrical projection 42 and, on the radial outside end, a cylindrical projection 43. The stop collars 38, 139 delimit the axial length of the needle contact face 41. The axial length of the needle contact face 41 positioned on the outside is smaller by the displacement clearance SA than the inner distance between the securing rings 26, 27. The length of the arm contact face 40 on the inside corresponds to the inner distance between the securing rings 26, 27. The axial displacement clearance SA is obtained as a result of the needle contact face 41, on the outside of the roller carrier 123, being shortened by an amount SA/2 on both sides, relative to the arm contact face 40 on the inside of the roller carrier 123. Thus, the cylindrical projections 42, 43 with respect to the roller axes AR, Increase the axial length of the arm contact face 40 beyond the extension of the needle contact face 41 on both the radial inside end and the radial outside end.

As far as the functioning of the inventive joint is concerned, the roller carrier 123 should be radially inwardly displaceable relative to the roller 25 with reference to the axis of the tripode star, which displaceability permits greater movements of the arm head 21 when the joint is articulated. Otherwise, the functioning process substantially corresponds to that of the roller assembly according to FIG. 3.

Figure 5B:
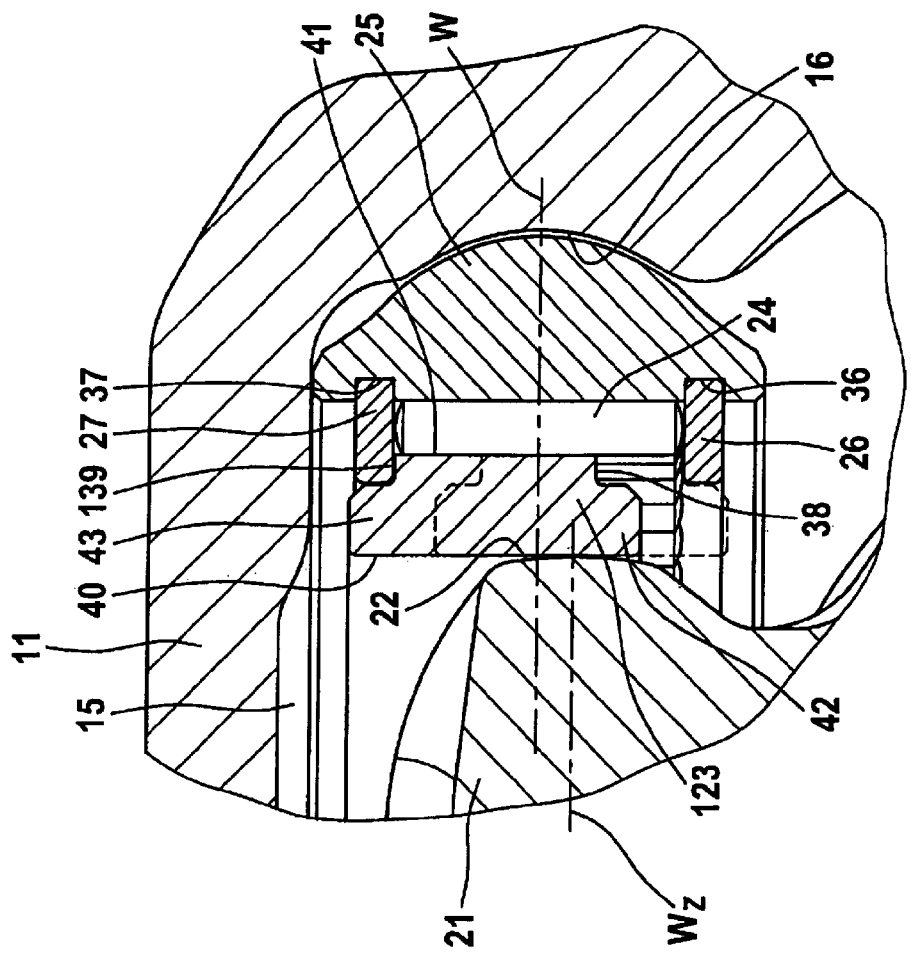
FIG. 5A and 5B show a tripode joint with a roller embodiment according to FIG. 4 in a cross-section at an articulation angle of 17° and in an enlarged detail, respectively.
Figure 5A:
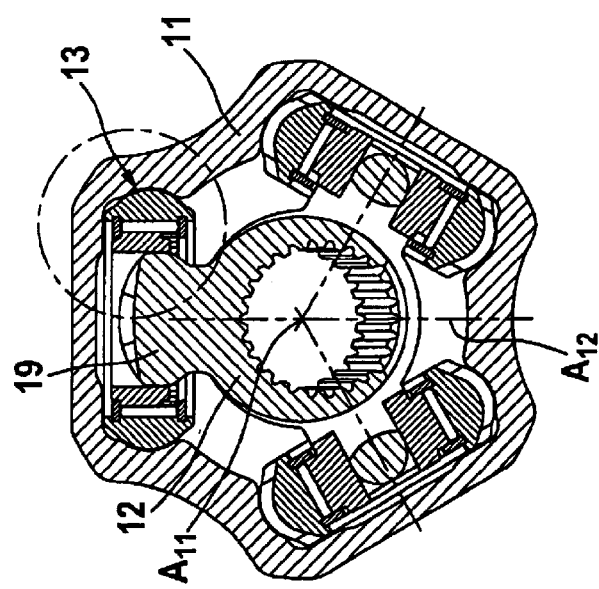

FIGS. 5A and 5B show the joint according to FIG. 4 in an illustration analogous to that of FIG. 1 in a cross-sectional view, but, relative to the axis A11 of the outer joint part 11, which axis is positioned normally on the drawing plane. The axis A12 of the tripode star 12 is articulated downwardly by 17°. As a result, the upwardly pointing tripode arm 19 has moved forwards from a central sectional position relative to the drawing plane, and the two tripode arms pointing downwardly at an angle have moved backwards from a central sectional position relative to the drawing plane. As a result of this articulation movement, the centers (not illustrated) of the spherical faces 22 of the arm heads 21 and thus also the contact points of the arm heads 21 have each moved radially inwards in the sectional plane relative to the roller carriers 123. The consequences thereof can be seen in the enlarged detail. The effective line WZ of the arm heads acting on the roller carrier is now clearly radially positioned inside the unchanged effective line WR of the outer joint part relative to the roller 25 which is positioned in the symmetry plane of the roller 25. In this illustration, the roller carrier 123 is shown in continuous lines in the radially outermost position relative to the roller 25 and the bearing needles 24, a position which the roller carrier 123 assumes when, free from torque, it moves radially outwardly under the influence of a centrifugal force. When the arm head 21, under torque load, moves from the outermost position radially inwardly, the roller carrier 123 will leave its outermost position and will move towards the extreme position on the radial inside, which extreme position is shown in dashed lines. The actual position of the roller carrier when torque-loaded should be between the two illustrated positions.

Figure 6B:
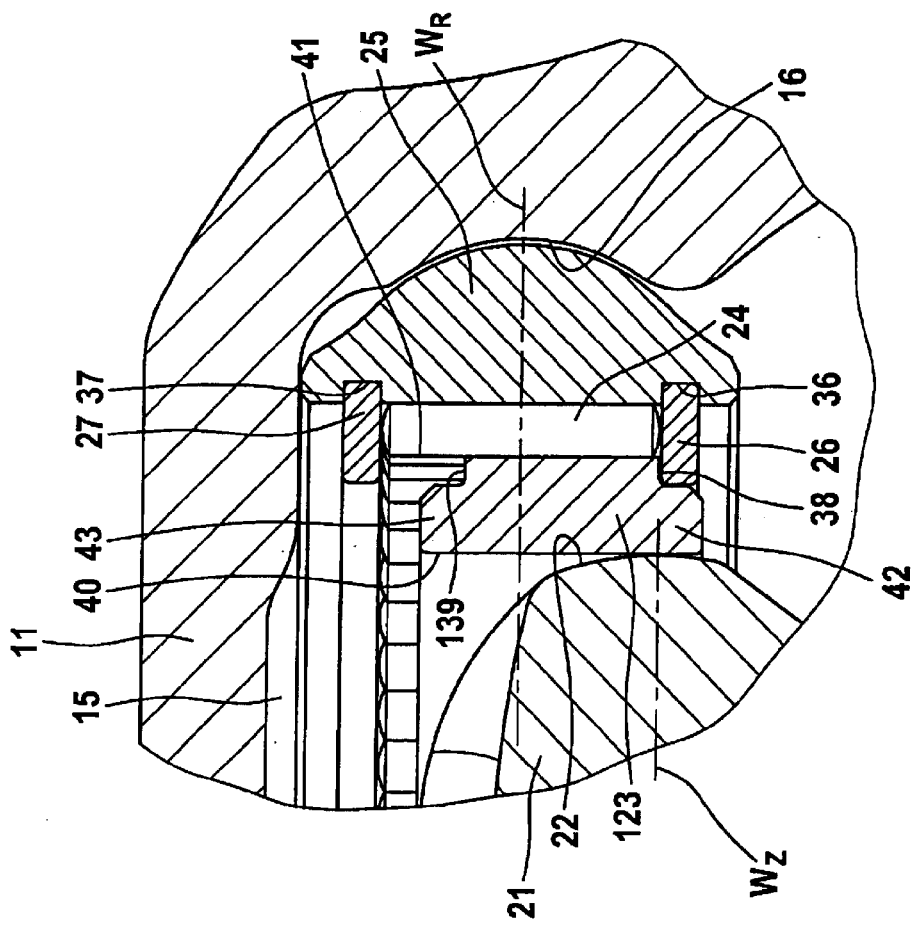
FIGS 6A and 6B show a tripode joint with a roller embodiment according to FIG. 4 in a cross-section at an articulation angle of 31° and in an enlarged detail, respectively.
Figure 6A:
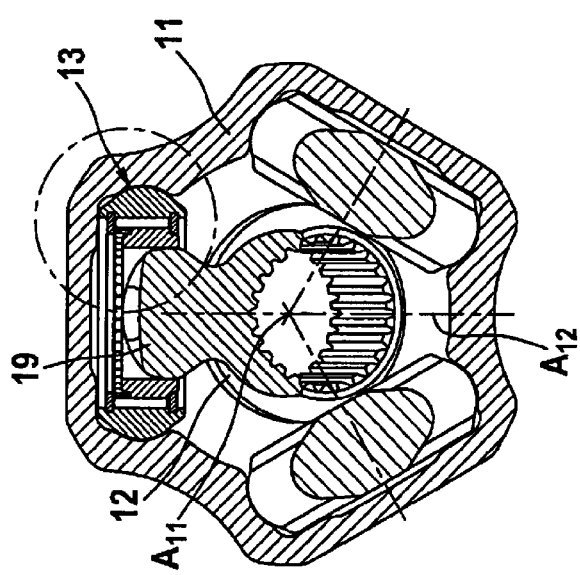

FIGS. 6A and 6B show the joint according to FIGS. 5A and 5B in an illustration which is analogous to the shown in FIGS. 5A and 5B, in a cross-sectional view but, relative to the axis A11 of the outer joint part which is positioned normally on the drawing plane, the axis A12 of the tripode star is articulated perpendicularly downwardly by 31°. As a result, the upwardly pointing tripode arm 19 has moved further forwards relative to the drawing plane, and the two tripode arms pointing downwardly at an angle have again moved further backwards relative to the drawing plane. As a result of the articulation movement, the centers of the spherical faces 22 of the arm heads 21 and thus also the contact points of the arm heads 21 have each moved further rapidly inwards in the sectional plane relative to the roller carriers 123. The consequences thereof can be seen in the enlarged detail. The effective line WZ of the arm heads acting on the roller carrier is now positioned at a greater distance radially inside the unchanged effective line WR of the outer joint part relative to the roller which is positioned in the symmetry plane of the roller 25. In this illustration, the roller carrier 123 is shown in continuous lines in the radially inner extreme position relative to the roller 25 and the bearing needles 24, a position which the roller carrier 123 assumes when, via the friction forces of the spherical face 22 which act on the arm contact face 40, it is pushed radially inwardly when the joint moves from an aligned position with coaxial axes A11, A12 into the maximum articulated position. As a result, the spherical face 22 of the arm head 21 continues to have secure contact with the arm contact face 40 of the roller carrier 123. In the examples of FIGS 5A, 5B, 6A and 6B, it can be seen that, at the roller assemblies, the axial length of the cylindrical projection 42 and the amount of axial displacement clearance SA are dimensioned such that, with a joint articulation angle of at least 27° and more particularly of at least 31° the spherical surface portions 22 of the arm heads 21 are able to establish a carrying contact with the arm contact faces 40 of the roller carriers. The displacement clearance SA can amount to at least 5% of the carrying length of the bearing needles, preferably at least 10% of the length and, in some cases, it can amount to 20–25% of the carrying length of the bearing needles.

While the invention has been described in connection with several embodiments, it should be understood that the invention is not limited to those embodiments. Rather, the invention covers all alternatives, modifications, and equivalents as may be included in the spirit and scope of the appended claims.

What is claimed is:

1. A tripode joint comprising:
    an outer joint part with a first longitudinal axis (A11) and having an inner recess and three uniformly circumferentially distributed recesses which widen said inner recess and which form pairs of circumferentially opposed tracks;
    a tripode star with a second longitudinal axis (A12) and having a hub and three uniformly circumferentially distributed tripode arms which are arranged radially at said hub and which each form an arm head with a spherical surface portion; and
    a roller assembly, on each of the arm heads, each of the roller assemblies being guided in one of the recesses and each roller assembly comprising an annular roller carrier, bearing needles rotating on the roller carrier, a roller which is rotatably supported on the bearing needles, wherein the roller carriers, on their inner faces, each comprise a cylindrical arm contact face and, on their outer faces, a cylindrical needle contact face, wherein the roller carriers, are arranged on the arm heads so as to be pivotable and displaceable along an arm axis (AZ) and wherein the rollers roll on the tracks with roller axes (AR) which are substantially axis-normal relative to the first longitudinal axis (A11), wherein the roller carriers, on their outer faces, each comprise stop collars which delimit the needle contact face, and which are held with an axial displacement clearance (SA) in the direction of the roller axes (AR) between axial securing members to permit translation of the roller carrier during joint articulation along the needle contact face over the axial displacement clearance (SA), wherein the roller carriers, on their inner faces, with reference to the first longitudinal axis (A11), at least on the radial inside end, each comprise cylindrical projections which, with reference to the roller axes (AR), increase the axial length of the arm contact faces beyond the extension of the needle contact faces, and wherein the axial securing members comprise at least one securing ring which engages an inner annular groove in the rollers.

2. A tripode joint according to claim 1, wherein, on the roller carriers, with reference to the first longitudinal axis (A11), on their radial outside end, the arm contact faces and the needle contact faces are flush with each other.

3. A tripode joint according to claim 2, wherein, at the roller assemblies, the axial length of the cylindrical projection and the amount of the axial displacement clearance (SA) are dimensioned to be such that, with a joint articulation angle of at least 27°, the spherical surface portions of the arm heads are able to establish a carrying contact with the arm contact faces of the roller carriers.

4. A tripode joint according to claim 2, wherein the displacement clearance (SA) amounts to at least 5% of the carrying length of the bearing needles.

5. A tripode joint according to claim 1, wherein the roller carriers, with reference to the first longitudinal axis (A11), on the radial outside end, each comprise cylindrical projections which, with reference to the roller axes (AR), increase the axial length of the arm contact faces beyond the extension of the needle contact faces.

6. A tripode joint according to claim 5, wherein, at the roller assemblies, the axial length of the cylindrical projection and the amount of the axial displacement clearance (SA) are dimensioned to be such that, with a joint articulation angle of at least 27°, the spherical surface portions of the arm heads are able to establish a carrying contact with the arm contact faces of the roller carriers.

7. A tripode joint according to claim 5, wherein the displacement clearance (SA) amounts to at least 5% of the carrying length of the bearing needles.

8. A tripode joint according to claim 1, wherein, at the roller assemblies, the axial length of the cylindrical projection and the amount of the axial displacement clearance (SA) are dimensioned to be such that, with a joint articulation angle of at least 27°, the spherical surface portions of the arm heads are able to establish a carrying contact with the arm contact faces of the roller carriers.

9. A tripode joint according to claim 8, wherein the displacement clearance (SA) amounts to at least 5% of the carrying length of the bearing needles.

10. A tripode joint according to claim 8, wherein the displacement clearance (SA) amounts to at least 10% of the carrying length of the bearing needles.

11. A tripode joint according to claim 1, wherein the displacement clearance (SA) amounts to at least 5% of the carrying length of the bearing needles.

12. A tripode joint according to claim 1, wherein the displacement clearance (SA) amounts to at least 5% of the carrying length of the bearing needles.

13. A tripode joint according to claim 1, wherein the displacement clearance (SA) amounts to at least 10% of the carrying length of the bearing needles.

* * * * *